(12) United States Patent
Zhou et al.

(10) Patent No.: US 9,122,959 B2
(45) Date of Patent: Sep. 1, 2015

(54) METHOD AND APPARATUS FOR AUTOMATED DELINEATION OF STRUCTURE SHAPE FOR IMAGE GUIDED TREATMENT PLANNING

(71) Applicant: IMPAC Medical Systems, Inc., Sunnyvale, CA (US)

(72) Inventors: Yan Zhou, Maryland Heights, MO (US); Xiao Han, Maryland Heights, MO (US); Lyndon S. Hibbard, Maryland Heights, MO (US); Virgil M. Willcut, Maryland Heights, MO (US)

(73) Assignee: IMPAC MEDICAL SYSTEMS, INC., Sunnyvale, CA (US)

( * ) Notice: Subject to any disclaimer, the term of this patent is extended or adjusted under 35 U.S.C. 154(b) by 182 days.

(21) Appl. No.: 13/886,853

(22) Filed: May 3, 2013

(65) Prior Publication Data
US 2014/0328527 A1    Nov. 6, 2014

(51) Int. Cl.
*G06K 9/46* (2006.01)
*G06K 9/66* (2006.01)
*G06T 7/00* (2006.01)

(52) U.S. Cl.
CPC .............. *G06K 9/66* (2013.01); *G06T 7/0083* (2013.01); *G06T 7/0089* (2013.01); *G06T 2207/20081* (2013.01); *G06T 2207/20128* (2013.01); *G06T 2207/30081* (2013.01)

(58) Field of Classification Search
USPC ........................................................ 382/190
See application file for complete search history.

(56) References Cited

U.S. PATENT DOCUMENTS

| | | | |
|---|---|---|---|
| 2007/0211939 A1* | 9/2007 | Kaus et al. | 382/173 |
| 2008/0081339 A1* | 4/2008 | Liu et al. | 435/6 |
| 2010/0280987 A1* | 11/2010 | Loboda et al. | 706/54 |
| 2011/0222751 A1* | 9/2011 | Barbu et al. | 382/131 |
| 2012/0053948 A1* | 3/2012 | Mustiere et al. | 704/500 |
| 2012/0155734 A1* | 6/2012 | Barratt et al. | 382/131 |
| 2012/0230572 A1 | 9/2012 | Kohlberger et al. | |
| 2014/0247977 A1* | 9/2014 | Han | 382/159 |
| 2014/0279727 A1* | 9/2014 | Baraniuk et al. | 706/11 |

OTHER PUBLICATIONS

M, Ktrschner et al., Automatic prostate segmentation in MR images with a probabilistic active shape model MICCAI, Oct. 2012.*
M. Kirschner et al., Automatic prostate segmentation in MR images with a probabilistic active shape model, MICCAI, Oct. 2012.

(Continued)

*Primary Examiner* — Gregory F Cunningham
(74) *Attorney, Agent, or Firm* — Finnegan, Henderson, Farabow, Garrett & Dunner LLP

(57) ABSTRACT

Disclosed herein are techniques for performing automated structure delineation on image data using trained landmark detectors and a shape refinement tool. The landmark detectors can be trained to detect a landmark in the image data based on image features that are indicative of intensity variations over a plurality of windows of the image data points. A machine-learning algorithm can be used to train the landmark detectors. The landmarks in the image data that are detected by the trained landmark detects can be used to initialize an iterative shape refinement to thereby compute a refined shape estimate for a structure of interest such as a prostate.

21 Claims, 10 Drawing Sheets

(56) References Cited

OTHER PUBLICATIONS

S. Ghose et al., A survey of prostate segmentation methodologies in ultrasound, magnetic resonance and computed tomography images, J. CMPB, vol. 108, No. 1, pp. 262-287, Oct. 2012.

P. Viola et al., Rapid object detection using a boosted cascade of simple features, IEEE CVPR, Kauai, HI, vol. 1, pp. 511-513, Dec. 2001.

S. Zhang et al., Shape prior modeling using sparse representation and online dictionary learning, MICCAI, pp. 435-442, Oct. 2012.

G. Litjens et al., Evaluation of prostate segmentation algorithms for MRI: The Promise12 challenge, J. Media, vol. 18, No. 2, pp. 359-373. Feb. 2014.

International Search Report and Written Opinion, issued in corresponding Int. Appln. No. PCT/IB2014/061157, mailed Sep. 4. 2014 (16 pages).

* cited by examiner

METHOD AND APPARATUS FOR AUTOMATED DELINEATION OF STRUCTURE SHAPE FOR IMAGE GUIDED TREATMENT PLANNING

INTRODUCTION

There is a need in the art for improving the efficiency and accuracy of how the shapes of structures of interest are automatically delineated within images. For example, there is a great need for accurately delineating the shape of a structure such as a prostate within patient images. By accurately delineating prostate shape, the planning for treatments such as radiotherapy can be rendered much more effective.

In an effort to satisfy this need in the art, the inventors disclose an apparatus for automatically delineating a structure of interest within image data, the image data comprising a subject image of a region of interest, the region of interest including the structure of interest, the image comprising a plurality of data points, the data points comprising a plurality of intensity values, the apparatus comprising a processor configured to (1) compute a plurality of features for a plurality of the data points, the features being indicative of intensity variations over a plurality of windows of the data points, (2) detect a plurality of locations for a plurality of landmarks within the image based on an application the computed features to a trained landmark detector, (3) generate a shape estimate for the structure of interest based on the detected landmark locations, and (4) refine the shape estimate according to a shape refinement tool to thereby compute a refined shape estimate for the structure of interest. With such an apparatus in an exemplary embodiment, the landmark detection can provide a useful initial rough approximation of structure shape based on a wide area of the image while the shape refinement tool can be used to refine an initial shape approximation using a narrower area of the image. Thus, in an exemplary embodiment, both local and global aspects of the image can be used to refine the shape for the structure of interest.

In accordance with another aspect, the inventors disclose a method for automatically delineating a structure of interest within image data, the image data comprising a subject image of a region of interest, the region of interest including the structure of interest, the image comprising a plurality of data points, the data points comprising a plurality of intensity values, the method comprising: (1) computing a plurality of features for a plurality of the data points, the features being indicative of intensity variations over a plurality of windows of the data points, (2) detecting a plurality of locations for a plurality of landmarks within the image based on an application the computed features to a trained landmark detector, (3) generating a shape estimate for the structure of interest based on the detected landmark locations, and (4) refining the shape estimate according to a shape refinement tool to thereby compute a refined shape estimate for the structure of interest, and wherein the method steps are performed by a processor Further still, the inventors disclose a computer program product for automatically delineating a structure of interest within image data, the image data comprising a subject image of a region of interest, the region of interest including the structure of interest, the image comprising a plurality of data points, the data points comprising a plurality of intensity values, the computer program product comprising a plurality of instructions that are resident on a non-transitory computer-readable storage medium and executable by a processor to (1) compute a plurality of features for a plurality of the data points, the features being indicative of intensity variations over a plurality of windows of the data points, (2) detect a plurality of locations for a plurality of landmarks within the image based on an application the computed features to a trained landmark detector, (3) generate a shape estimate for the structure of interest based on the detected landmark locations, and (4) refine the shape estimate according to a shape refinement tool to thereby compute a refined shape estimate for the structure of interest.

In accordance with yet another exemplary aspect described herein, the inventors disclose an apparatus for training a landmark detector using a plurality of atlas images, the atlas images including location information for a landmark with respect to a structure of interest, the apparatus comprising a processor configured to (1) collect a plurality of positive samples and a plurality of negative samples from the atlas images, (2) compute a plurality of Haar-like features for the collected positive and negative samples, and (3) apply the computed Haar-like features and location data associated with the computed Haar-like features to a machine-learning algorithm to train a landmark detector to detect the landmark. A corresponding method and computer program product are also disclosed.

In accordance with still another exemplary aspect described herein, the inventors disclose an apparatus comprising a processor configured to (1) receive input corresponding to a selection of a first landmark location for a prostate within an image, (2) access data representative of a contour for the prostate within the image, (3) automatically select a plurality of additional landmark locations for the prostate along the contour according to a spatial distance criteria applied to the first landmark location, and (4) store the first landmark location and the additional landmark locations in association with the image. A corresponding method and computer program product are also disclosed.

Still further, the inventors disclose an apparatus comprising a processor configured to (1) resolve a plurality of candidate locations for a landmark with respect to a structure in an image to a single landmark location based on a probability map, the probability map being defined according to a Gaussian distribution model for the landmark, (2) repeat the resolving operation for a plurality of different landmarks, (3) initialize a shape estimate for the structure based on the single landmark locations, and (4) iteratively refine the shape estimate. A corresponding method and computer program product are also disclosed.

These and other features and advantages of the present invention will be apparent to those having ordinary skill in the art upon review of the teachings in the following description and drawings.

DETAILED DESCRIPTION

Various embodiments will now be described that relate to both training an automated landmark detector using a machine learning algorithm and performing automated contouring of a structure of interest within image data using trained landmark detectors and a shape refinement tool.

It should be understood that the images processed using the techniques described herein can be take any of a number of forms. In various exemplary embodiments, the images can be medical images such as CT images. However, it should be understood that images of different types can be employed. For example, image types such as magnetic resonance (MR) images and ultrasound images could also be processed using the techniques described herein. The images can comprise a plurality of image data points, whose locations can be expressed through a coordinate system.

Figure 1:
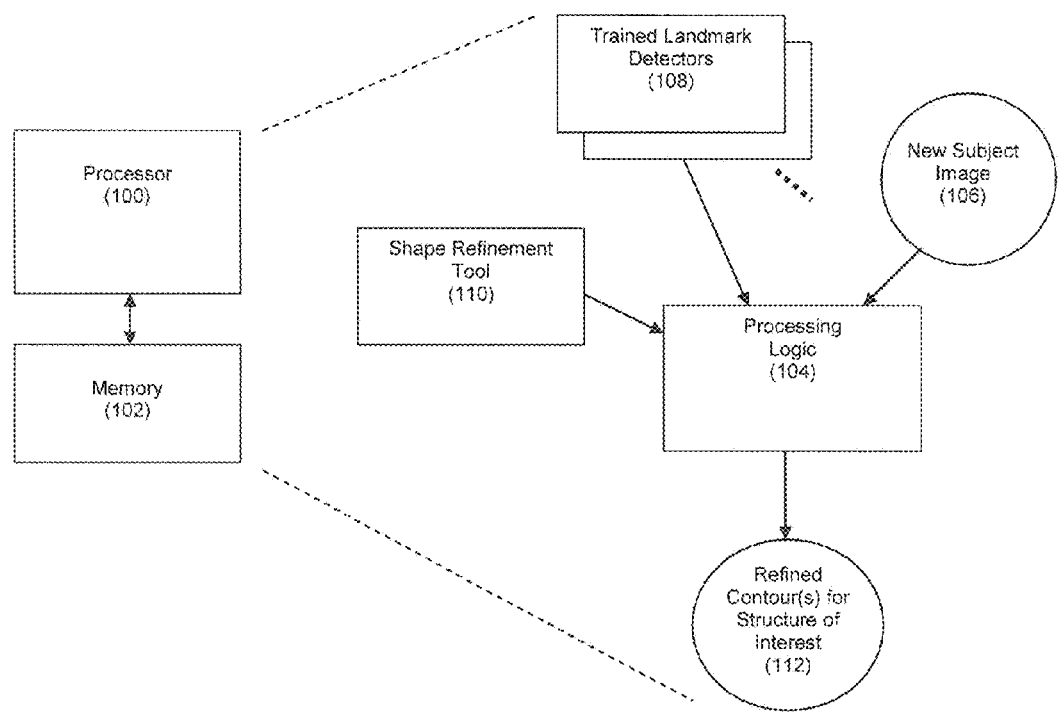
FIG. 1 depicts an exemplary embodiment for processing a subject image using trained landmark detectors and a shape refinement tool.

FIG. 1 depicts an exemplary embodiment for automatically delineating a structure shape within image data. As shown in FIG. 1, a processor 100 can be configured to implement processing logic 104 whereby a new subject image 106 is processed with the aid one or more trained landmark detectors 108 and a shape refinement tool 110 to generate one or more refined contours 112 for the structure of interest. The refined contour data 112 can take any of a number of forms. For example, the contour data may comprise a plurality of image data points that fall lie on the boundary for the structure of interest (e.g., 60 data points evenly distributed (on the contour) where each point is represented by its coordinates within the image. Also, it should be understood that the subject image 106 can be either a two-dimensional (2D) image or three-dimensional (3D) image.

The processor 100 can be any processor with sufficient computational capabilities to implement the automated delineation features described herein. It should be understood that processor 100 may comprise multiple processors, optionally distributed via a network. The programming instructions for implementing the processing logic 104 can be resident on a non-transitory computer-readable storage medium (e.g., memory 102) for access and execution by the processor 100. It should be understood that the memory 102 may comprise multiple memory devices, optionally multiple distributed memory devices and/or memory devices of different types.

The trained landmark detectors 108 are configured to process data points of the image 106 to automatically detect the presence and location of certain landmarks within the image 106. In an exemplary embodiment, each trained landmark detector 108 is configured to detect a different landmark, although this need not be the case. The landmark detectors 108 can take any of a number of forms, such as a set of machine-executable rules. Furthermore, if desired by a practitioner, the trained landmark detectors 108 can be configured to process multiple points of an image in parallel, although this need not be the case. As discussed below, the landmarks can be detected via analysis of various attributes of the image data points. It is expected that different landmarks will be used for different structures and other factors. The detected landmarks can then be used to generate an initial shape estimate for the structure as discussed below.

The processor 100 can leverage the shape refinement tool 110 and the output of the trained landmark detectors 108 to automatically estimate the boundary for the structure of interest within the image 106. An example of a shape refinement tool 110 that can be employed is a boundary detector, which can take any of a number of forms, including a trained boundary detector that comprises a set of machine-executable rules. Another example of a shape refinement tool that can be employed is a shape deformation algorithm. Furthermore, if desired by a practitioner, the shape refinement tool 110 can be configured to process multiple points of an image in parallel, although this need not be the case. The shape refinement tool 110 can operate iteratively to estimate and adjust the estimated boundary for the structure of interest to generate the refined contour data 112.

Figure 2:
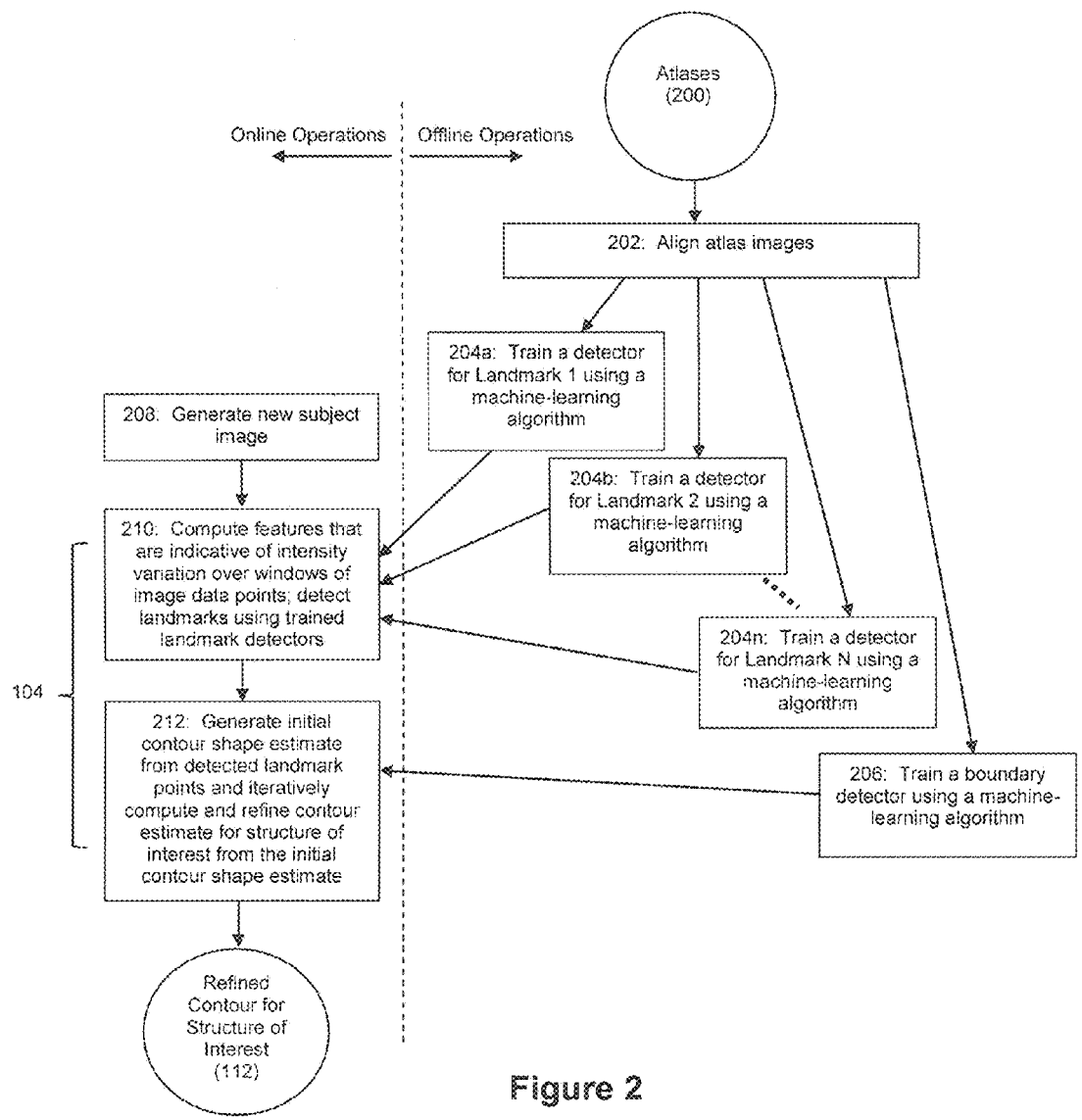
FIG. 2 depicts an exemplary process flow for training the landmark detectors and a boundary detector in cooperation with the automated delineation of structure shape within a subject image.

FIG. 2 depicts an exemplary process flow that expands on how subject images 106 can be processed to generate refined contours 112. The left half of FIG. 2 (relative to the vertical dashed line) illustrates a process flow generally corresponding to the operations performed by processing logic 104. The right half of FIG. 2 (relative to the vertical dashed line) illustrates a process flow that is performed to train the landmark detectors 108 and the boundary detector 110 using machine-learning algorithms. In an exemplary embodiment, the right half of FIG. 2 is performed offline, while the left half of FIG. 2 is performed online. That is to say, the tasks of training the various detectors can be performed prior to the new subject image 106 being generated or processed. Thus, the trained landmark detectors 108 and a trained boundary detector can already be ready to process image data by the time there is a need to process a new subject image 106. Accordingly, the processing logic 104 will be able to generate refined contour estimates in an efficient manner, which can be particularly useful in instances where there is a desire to use the refined contour data quickly after the new subject image is taken. However, it should be understood that, if desired, a practitioner could nevertheless choose to implement the tasks of training the detectors in-line with the processing of the new subject image.

For the offline operations, training data such as atlas images 200 can be processed using machine-learning algorithms to create the trained landmark and boundary detectors. The atlas images 200 preferably include annotations that serve as reference data for information of interest to the training process. For example, the atlases 200 used to train the landmark detectors can include an identification of where the landmarks are located in those atlas images. Similarly, the atlases 200 used to train the boundary detector can include an identification of where the boundary for the structure of interest is located. In some instances, the atlas images may include both the landmark information and the boundary information, in which case such atlas images can be used to train both the landmark detectors and the boundary detector, but this need not be the case. The annotations included in the atlases can be provided by trained expert personnel through manual techniques or provided through automated techniques, preferably after confirmation of the automated results for accuracy. As such, in an exemplary embodiment, the corpus of training data can serve as reliable identifications of where landmarks and boundaries are present in prior images. In exemplary embodiments, the atlas images 200 can be images of people other than the person who is the subject of the new image 106, but this need not be the case. In some instances, the atlases 200 may be prior images of the subject himself/herself.

At step 202, the atlas images are aligned so as to create a common frame of reference for assessing landmarks and boundaries. Any of a number of techniques can be used for the image alignment/registration operation. For example, a rigid transformation technique can be used at step 202. Such rigid transformation can be performed pair-wise on slices of atlas image volume data. An example of a suitable rigid transformation technique is similarity transformation, although other techniques such as mutual information-based registration, affine transformation, etc. can also be employed, as described by Zitova et al., "*Image registration methods: a survey*", Image and Vision Computing, 21, p. 977-1000 (2003), the entire disclosure of which is incorporated herein by reference. There are 4 degrees of freedom: scale, rotation, x-directional translation, and y-directional translation.

Figure 3:
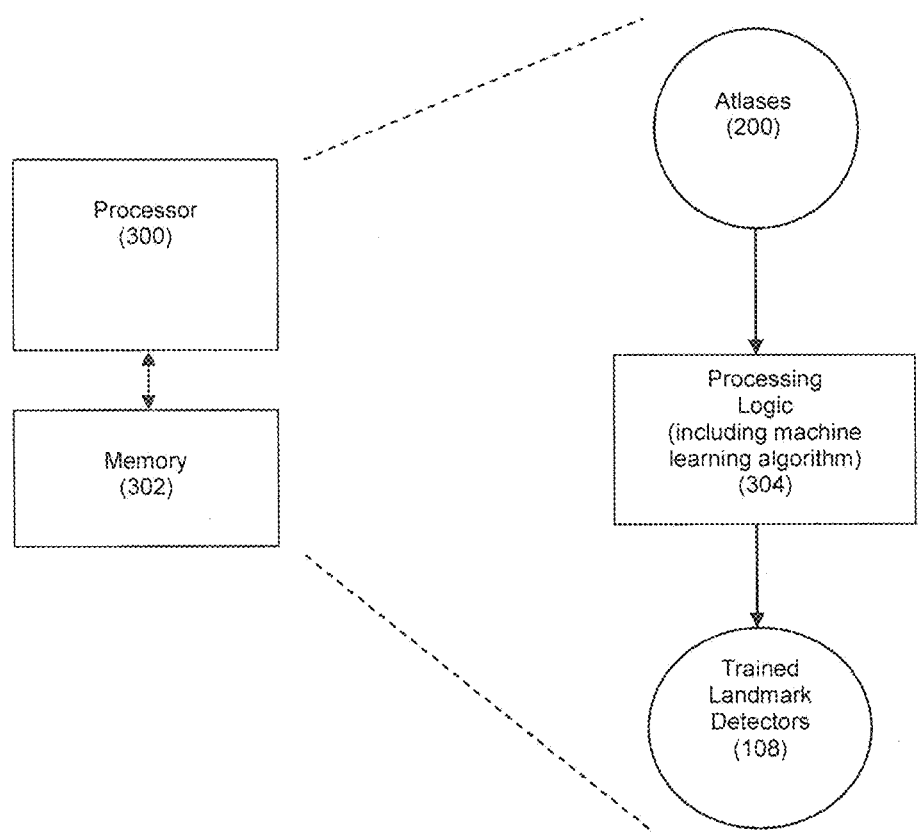
FIG. 3 depicts an exemplary embodiment for training a landmark detector using atlas image data.
Figure 4A:
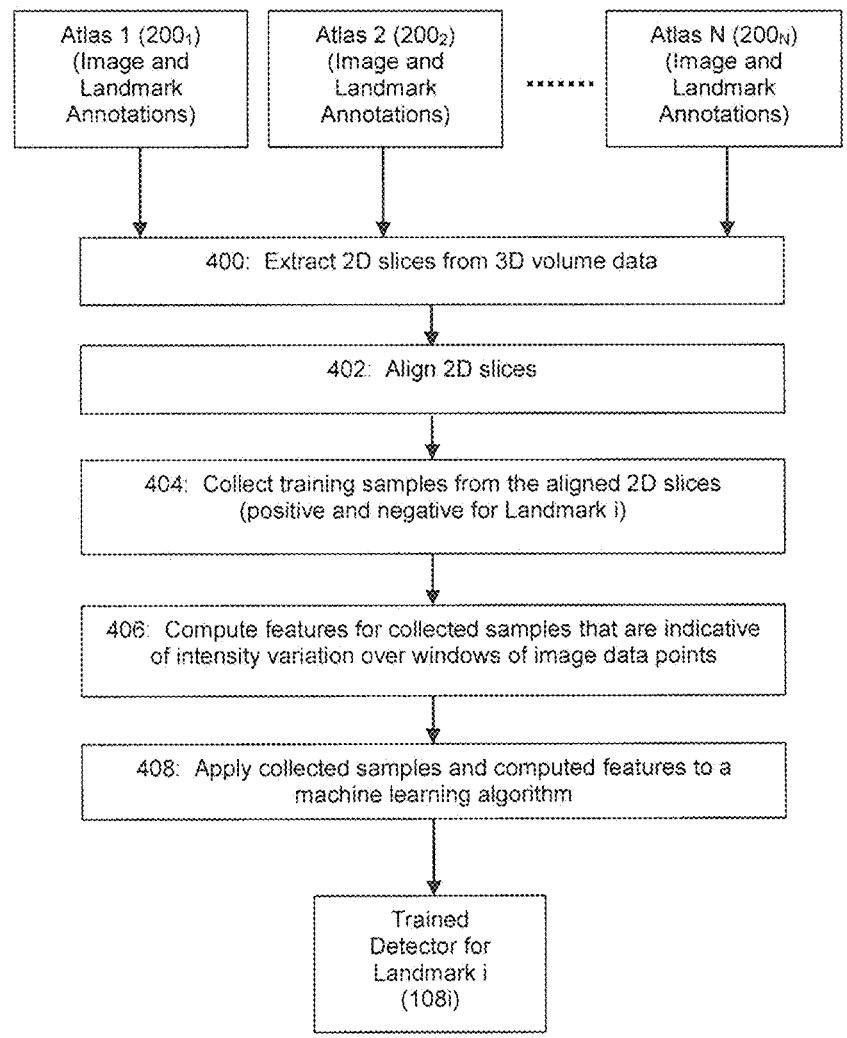
FIG. 4(a) depicts an exemplary process flow for training a landmark detector using a machine-learning algorithm.
Figure 4B:
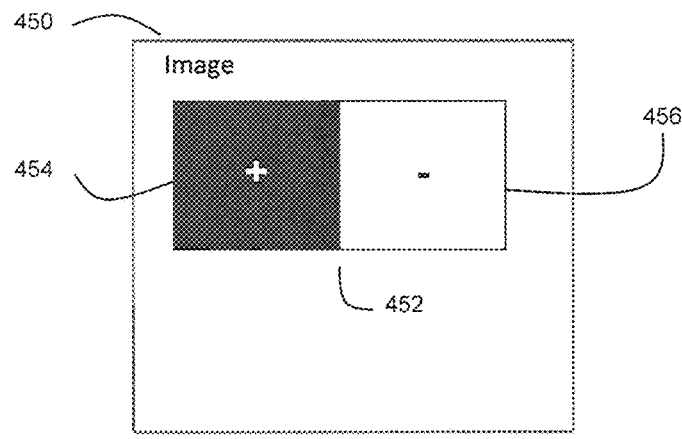
FIGS. 4(b) and (c) depict examples of how Haar-like features can be calculated for an exemplary embodiment.
Figure 4C:
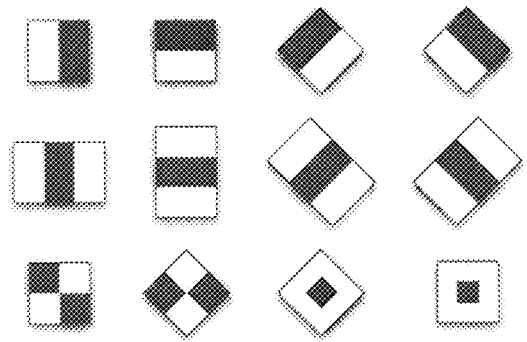
Figure 5:
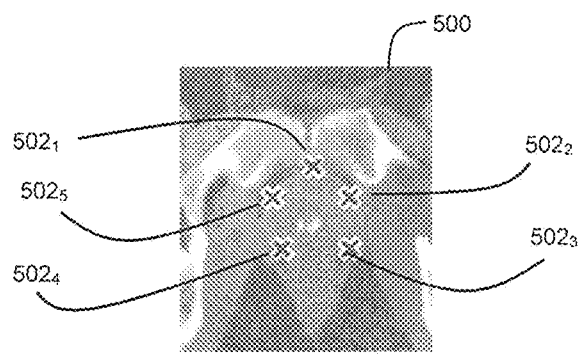
FIG. 5 depicts an exemplary image that shows a plurality of landmarks for a structure of interest.

At step 204, the aligned atlas images are processed to train the landmark detectors 108 using a machine-learning algorithm. As shown in the example of FIG. 2, a different training operation can be performed for each landmark of interest. FIGS. 3 and 4 elaborate on how this training can be performed. FIG. 5 depicts an exemplary image 500 of a prostate region showing the locations of different landmarks of interest 502 thereon. A different detector 108 can be trained to find each landmark 502.

In this example, the different landmarks 502 are five anatomical points on the prostate region. These landmark points can be selected so as to closely approximate the expected prostate anatomical structure where there is a good contrast relative to the neighboring non-prostate region. In an exemplary embodiment, for each atlas image slice, there will be an annotated ground-truth contour of the prostate. Such a ground-truth contour can be represented by 60 evenly distributed points (on the contour), where each point is represented by its (x, y) coordinates within the atlas image slice.

The top central landmark $502_1$ can be manually selected from one of the contour points by an expert or other appropriately skilled person. In an exemplary embodiment, the top central landmark $502_1$ is located on the ground-truth contour and in the middle region of the image at around the same distance to the left and right of the pubic bones. That is, a trained person can select the location along the ground-truth contour that is approximately equidistant between the leftmost portion of the right pubic bone and the rightmost portion of the left pubic bone (with reference to the image perspective shown by FIG. 5) to serve as the top central landmark $502_1$. The remaining 4 landmark points can be selected automatically according to a selection criteria roughly corresponding to distance. For example, the remaining 4 landmark points can be selected from the contour points so as to create gaps between landmark points of, moving clockwise from the top central landmark point $502_1$, 10 contour points (for landmark point $502_2$), 10 contour points (for landmark point $502_3$), 20 contour points (for landmark point $502_4$), and 10 contour points (for landmark point $502_5$), thus leaving 10 contour points between landmark points $502_5$ and $502_1$. It should be understood that different spacing criteria between landmark points could be employed if desired by a practitioner.

FIG. 3 illustrates a processor 300 and memory 302 that are configured to cooperate with each other to execute processing logic 304, where the processing logic implements steps 202 and 204 of FIG. 2. The processor 300 and memory 302 can optionally be the same as processor 100 and memory 102, although this need not be the case. The processing logic 304 can be resident on a non-transitory computer-readable storage medium (e.g., memory 302) for access and execution by the processor 300. FIG. 4(a) depicts an exemplary process flow for processing logic 304 to implement steps 202 and 204.

In the example of FIG. 4(a), the different atlases 200 (e.g., $200_1, 200_2, \ldots$) comprise 3D image volumes. At step 400, the processor extracts 2D slices from the 3D volume data. At step 402, the 2D slices from a common atlas are aligned, preferably in a pair-wise manner. As noted, this alignment process can use a rigid transformation or other suitable image registration techniques. The aligned slices will depict a region of interest that includes the structure of interest. For example, in an embodiment where the structure of interest is the prostate, it can be expected that the image slices will encompass the full prostate area, all or part of the symphysis pubis, and all or part of the rectum.

At step 404, the processor collects a plurality of training samples from the aligned 2D slices. Both positive training samples and negative training samples can be collected. For example, the landmark point itself and a plurality of points that are deemed to be spatially near the landmark point can be collected from a 2D slice to define the set of positive samples for that 2D slice. As an example, a 1 mm distance from the landmark point can be used to govern the region from which positive samples are selected. The positive samples can be selected randomly within this region. For negative samples, the processor can select a plurality of points from the 2D slices that are deemed to not be near the landmark of interest. A larger distance threshold relative to the landmark point can be used to define this negative region. The processor can also be configured to randomly select the negative samples from this negative region. Moreover, the processor can make these selections to achieve a ratio between positive and negative samples of around 1:1.5.

At step 406, the processor computes features for the collected training samples that are indicative of intensity variation over windows of image data points. For example, the features can be Haar-like features. The Haar-like features can be used to represent rectangular regions at each sample location. An example is shown by FIG. 4(b) where a rectangular region 452 (or window) of image 450 is selected. The Haar-like feature can be computed as the difference between the sum of pixel intensities inside the darkened "+" region 454 and the sum of pixel intensity values inside the white "−" region 456. Any of a number of patterns for the window 454 with corresponding "+" and "−" regions can be employed, as indicated by FIG. 4(c). In an exemplary embodiment, the window pattern shown in the bottom left of FIG. 4(c) can be employed. With such an embodiment specifically, step 406 can consider 4 adjacent rectangular regions centered at the subject sample point in a detection window. The pixel intensities within each rectangular region are summed, and then the differences between these sums are calculated. Each difference is recorded as a value in a feature vector for that sample. The size of the extracted feature vector will vary with the size of the detection window. In an exemplary embodiment, the window size can be 24 mm by 24 mm, although it should be understood that different window sizes could be employed. A description of how Haar-like features can be computed is found at Viola, et al., *"Rapid object detecting using a boosted cascade of simple features"*, Proc. of IEEE Conf. on Computer Vision and Pattern Recognition", p. 511-518 (2001), the entire disclosure of which is incorporated herein by reference.

At step 408, the processor applies the collected samples and their computed attributes to a machine-learning algorithm to train a landmark detector to distinguish between points that qualify and do not qualify as the landmark of interest. Because a Haar-like feature is a weak learner or classifier, a relatively large number of Haar-like features are preferably used to describe an object with accuracy. Therefore, the Haar-like features can be organized and learned by a cascade of simple classifiers to form a strong learner. In an exemplary embodiment, the machine-learning algorithm used for this purpose can be the LogitBoost machine-learning algorithm.

The LogitBoost algorithm can be used to learn from the weak classifiers. Specifically, the weak classifiers are trained sequentially. The weight distribution of the training set can be updated between iterations according to the accuracy of classification of the previous classifiers. The weight of misclassified samples is increased for the next iteration, whereas the weight of the correctly classified samples is decreased. The next classifier is then trained with such as re-weighted distribution. The amount of change on the weight of each classifier is proportional to the classification error of the classifier. With the LogitBoost algorithm, adaptive Newton steps can be used to fit an adaptive symmetric logistic model. This approach provides an advantage in that it places less emphasis on samples that are poorly classified, since those samples are most likely to be outliers that should be excluded from the calculation. Step 408 thus operates to produce a trained landmark detector 108$_i$ for the landmark i of interest that is flexible and robust. The trained landmark detector 108$_i$ for the landmark i can be a group of trained simple classifiers, where each classifier has a trained threshold and a trained weight value that defines its importance. As discussed below, these parameters can be leveraged during the detection phase.

A description of the LogitBoost machine-learning algorithm can be found at Friedman et al., *"Additive logistic regression: a statistical view of boosting"*, Annals of Statistics, 28(2), p. 337-407 (2000), the entire disclosure of which is incorporated herein by reference. However, it should be understood that other machine-learning algorithms could be employed to train the landmark detectors 108, such as the AdaBoost, FloatBoost, Any Boost, and MarginBoost machine-learning algorithms.

Once again, it should be understood that the process flow of FIG. 4(*a*) can be performed separately for each landmark of interest. Optionally, different processors and memories can be configured to train the different landmark detectors 108.

Figure 8:
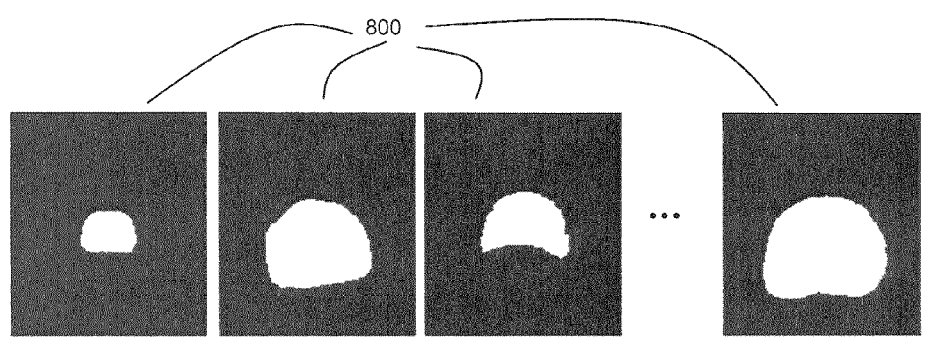
FIG. 8 depicts exemplary atlas images with boundary information for a structure of interest.

Returning to FIG. 2, at step 206, the aligned atlas images are processed to train a boundary detector using a machine-learning algorithm. This operation can be performed by a processor and memory in a manner similar to that described by FIG. 3. In an exemplary embodiment, the machine-learning algorithm for step 206 can be the random forests (RF) machine learning algorithm (see Breiman, Leo, "Random Forests", *Machine Learning*, 45 (1): 5-32, 2001, the entire disclosure of which is incorporated herein by reference). FIG. 8 depict examples of atlas images 800 that show boundary information for a structure of interest (the boundary being defined by the transition between the white regions and black regions within each image 800.

The RF algorithm in this instance operates to produce a trained boundary detector that is a collection of decision trees. Each decision tree is a set of decision rules organized in a tree-like structure. Each node of the tree applies a decision rule, which is often called a test function or a split function. Each test function takes an attribute or feature value as input and produces a binary (yes/no) output. Based on the yes/no answer, the input data is sent to either the left or the right child-node of the current node. The child node will run another test based on a new feature value. This is repeated until the so-called "leaf-node" is reached. A "leaf-node" is a tree node without "children" nodes. Each leaf-node has a classification label associated with it but sometimes it can also be a probability value indicating the likelihood of belonging to a particular classification (e.g., boundary status). The rules can be expressed as test functions with binary outputs, e.g.:

$$h(v_i, a_i, b_i) = \begin{cases} 1, & \text{if } a_i \leq v_i \leq b_i \\ 0, & \text{otherwise} \end{cases}, \quad (1)$$

where $v_i$ denotes the i-th feature value, and $a_i, b_i$ are two thresholds. Thus, with a boundary detector that was trained using the RF algorithm, the detector can take the form of an ensemble of decision trees, where each tree is a set of decision rules organized in a tree or flowchart-like structure, where each internal (non-leaf) node denotes a test on an attribute (i.e., a decision rule), each branch represents an outcome of the test, and each leaf (or terminal) node holds a classification label (e.g., boundary status).

During step 206, the trees can be built in parallel if desired since each tree is trained independent of the others. The training samples are used by the RF algorithm to "learn" the tree, i.e., to decide which decision rule to use at each internal tree node. For the RF algorithm, each tree is built using a random subset of the training data such that different trees are highly uncorrelated. Once training samples are collected and their attributes are computed for a tree, the tree is built recursively by adding one node at a time. At each node, the RF algorithm aims to find the best decision rule that most efficiently splits the training data arriving at the current node. In the case of binary classification, "best splitting" means that each branch of the node should contain as many samples from the same class as possible. Thus, the training or learning process with the RF algorithm aims to determine which feature to use at the current node and what threshold values to apply to best split the training data. With the RF algorithm, only a small, random subset of all features are considered at each node, and the "best" feature is selected among this random subset instead of using all features. This randomization again aims to make the trees as independent as possible. Each newly added node splits the incoming (training) data into two branches (two subsets), and each subset will be tested again at the subsequent child node. Thus, each (non-leaf) node can have two children node. The tree continues growing until the training data arriving at each child node all belong to the same class. The child node then becomes a leaf node of the tree, and the class label of the training data arrived at the child node becomes the label of that leaf node.

There are a number of RF algorithm implementations that are publicly-available, for example the Weka machine-learning software package is available online, and it includes an RF algorithm software package. These software packages also include known interfaces through which training samples can be applied to the machine learning algorithm. Moreover, the trained boundary detector produced by such software packages can take a form such as a text file that expresses the decision tree as machine-executable rules.

The RF algorithm can thus naturally handle multiple classes if desired, i.e., one detector to classify several structures (plus the background). The output of a RF-based detector can be a probability estimation of which class the input data belongs to, which is also preferred over a hard decision as some other learning algorithms would produce. In addition, the RF algorithm is fast in both detector training and detector application, and it can deal with very large dimensions of input data.

However, it should be understood that other machine-learning algorithms could also be employed at step 206 if desired by a practitioner. Examples of other machine-learning algorithms that can be employed at step 206 include the LogitBoost algorithm as well as those described in Witten, I. H., Frank, E., Hall, M. A.: Data Mining: Practical machine learning tools and techniques. Third Edition, Morgan Kaufmann Publishers (2011), the entire disclosure of which is incorporated herein by reference, such as the Support Vector Machine (SVM) or AdaBoost machine learning algorithms.

Once the landmark detectors 108 and the boundary detector have been trained, the system is ready to process new subject images 106. Turning to the online portion of FIG. 2, at step 208, the new subject image is generated. Any suitable image generation technique and equipment can be used at step 208. Furthermore, it should be understood that the generated image 106 can be a 2D or 3D image. If a 3D image volume is generated, step 208 can also include generating 2D slices of the 3D image volume as well as performing alignment of the 2D slices (using an image registration technique as previously discussed).

Figure 6A:
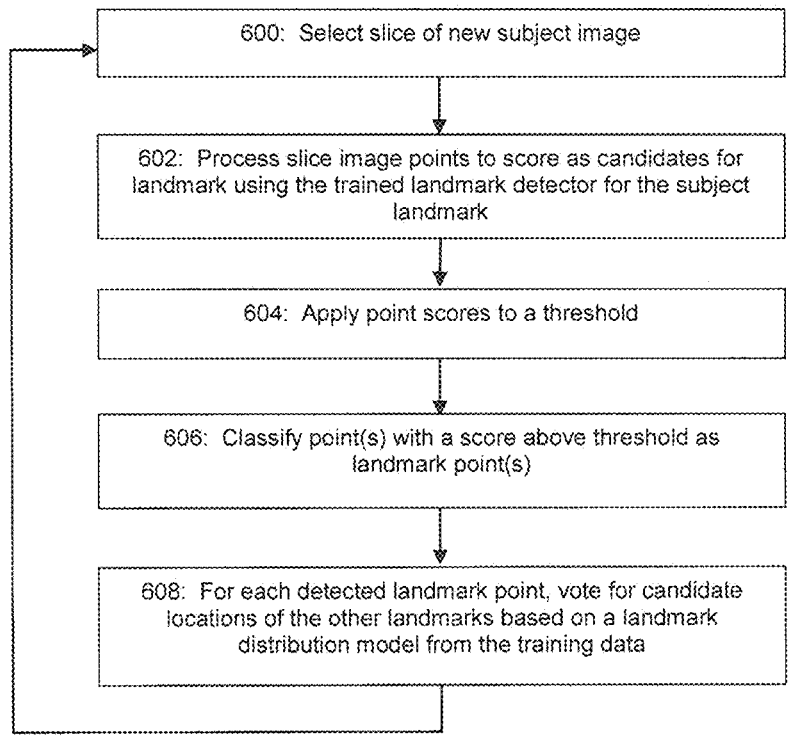
FIGS. 6(a) and (c) depict exemplary process flows for applying trained landmark detectors to a new subject image to detect landmarks location therein.
Figure 6B:
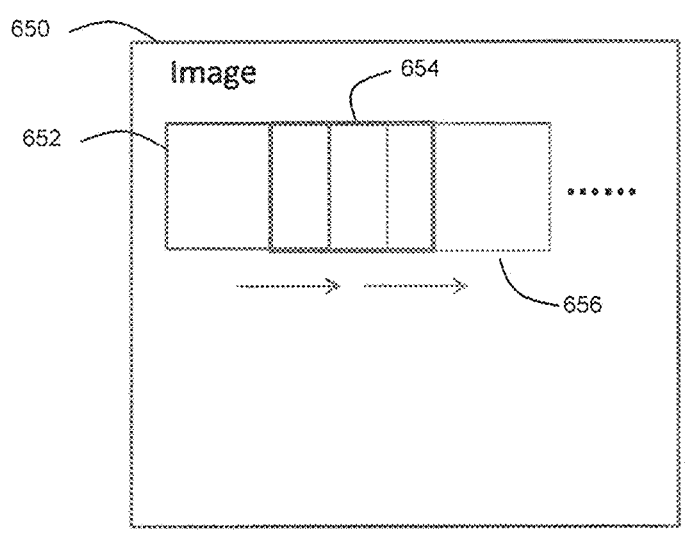
FIG. 6(b) depicts an example of how Haar-like features can be calculated over a sliding window of an image during a detection phase.
Figure 6C:
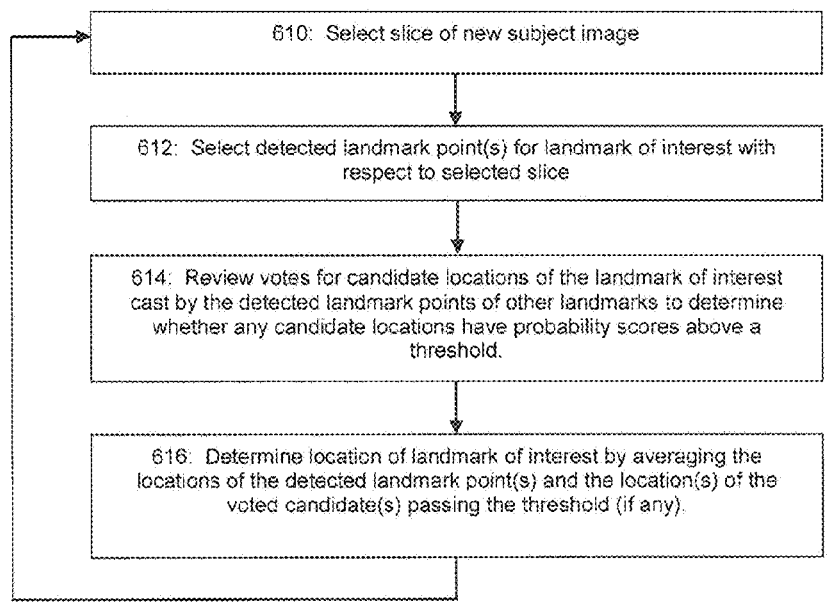

At step 210, the processor processes the new subject image data using the trained landmark detectors 108 to detect the locations of landmarks of interest within the image data. In doing so, step 210 can compute features that are indicative of intensity variation of windows of the subject image data points, and then apply these computed features to the trained landmark detectors. FIGS. 6(*a*) and (*c*) depicts exemplary process flows for step 210. It should be understood that the process flow of FIG. 6(*a*) can be repeated for each landmark detector 108 employed by the system. Thus, if 5 landmark detectors are used to detect 5 different landmarks, then the process flow of FIG. 6(*a*) (or at least steps 602-608 of FIG. 6(*a*)) can be repeated for each landmark of interest. Similarly, the process flow of FIG. 6(*c*) can be repeated for each landmark of interest.

At step 600, the processor selects a 2D slice of the new subject image 106 to process. At step 602, the processor applies points of the selected image slice to the trained landmark detector 108 for the landmark of interest. This step can operate on all of the points of the selected image slice or on a targeted subset of the image points. For example, if it is known that the landmark of interest will reside in a definable portion of the image slice (e.g., the left half of the image), then step 602 can be configured to select only points within the desired image portion for processing. With step 602, the processed image points are scored with regard to their suitability as candidates for the landmark of interest. To score the points, the features described above for training the landmark detector 108 are computed for the image slice points (e.g., Haar-like features). The image slice points and their computed features are then applied to the landmark detector 108 for the landmark of interest to compute a score for each point that is indicative of its suitability as a candidate for the landmark of interest.

At step 604, the computed point scores are compared with a defined threshold. This threshold can be configurable based upon the desires of a practitioner. Those points having scores above the threshold can be classified as landmark points (step 606).

More specifically, for steps 602-604, a window of a defined target size is moved over the image slice, and for each subsection of the image, the Haar-like feature is calculated. FIG. 6(*b*) illustrates this sliding window concept. A sliding window corresponding to the size of the Haar-like feature window slides over all desired locations of the image 650. FIG. 6(*b*) shows examples of the sliding window in three different positions corresponding to 652, 654, and 656. The Haar-like features can be computed in the same fashion as they were during the training phase. For each computed Haar-like feature from the image slice, each classifier of the trained landmark detector 108*i* (for the subject landmark i) makes a binary decision according to its trained threshold value. Thus, if the trained landmark detector 108 includes a set of 10 classifiers, each classifier will reach a binary decision based on its associated threshold value. The final decision for the landmark detector with respect to the Haar-like feature for a given sliding window position is a weighted sum of the decisions from the individual classifiers (using each classifier's associated weight). If this weighted sum passes a defined configurable threshold, the center of that sliding window position will be marked as a detected landmark point.

In some instances, it may be the case that the computed Haar-like features for multiple positions of the sliding window cause multiple points to be detected as landmark points for a given landmark. In other instances, the detected landmark point may fall out of a normal/expected range (an outlier point). To help resolve the landmark location in such scenarios, each detected landmark point for a subject landmark votes for the candidate locations of all other landmarks based on a distribution model for the landmarks.

As an example, this distribution model can be a Gaussian model of how landmark points are distributed according to their relative distances between each other amongst the slices of the training data. With such a model, instead of a landmark point voting for a single candidate location each of the other landmark points, it will vote for a probability map which follows the built Gaussian distribution, where the voted values on the probability map sum to 1.

Then, after the voting stage (and after the process flow of FIG. 6(*a*) has been repeated to detect landmark points for all of the subject landmarks with respect to an image slice), the processor can make a final determination of landmark locations according to the process flow of FIG. 6(*c*). At step 610, the processor selects a slice of the new subject image. As noted, at this stage, the process flow of FIG. 6(*a*) will have been repeated to detect landmark points and collect votes for candidate landmark locations with respect to all of the landmarks for the selected slice. At step 612, the processor selects the detected landmark point(s) for the subject landmark with respect to the selected slice (see step 606). At step 614, the processor reviews the votes for candidate locations of the subject landmark that were cast by the detected landmark points of the other landmarks (see step 608). As part of this, the probability maps from the automated voting process for the subject landmark with respect to the slice can be merged such that the merged probability map sums to 1. The processor will select candidate locations from the merged probability map that are above a defined and configurable threshold. Next, at step 616, the processor can determine the location for the subject landmark by averaging the location(s) of the detected landmark point(s) from step 612 and the location(s)

of the candidate(s) that passed the threshold set by step 614 (if any). This approach can effectively group multiple landmark detections together while greatly reducing the impact of outlier detections. As another example of combining the detected landmark point with the voted landmark points, the merged probability map can also include the detected landmark point from the step 612. A relative weighting between the detected landmark point and the voted landmark locations can be assigned, preferably with a stronger weight being given to a detected landmark point than to an individual voted landmark location (e.g., a weight of "1" for the detected landmark point(s) and a weighting for the voted landmark locations such that their aggregated weights sum to "1"). Once again, the highest scoring location can be selected as the landmark location or an average location of all locations scoring above a certain threshold can be selected as the landmark location.

Figure 7:
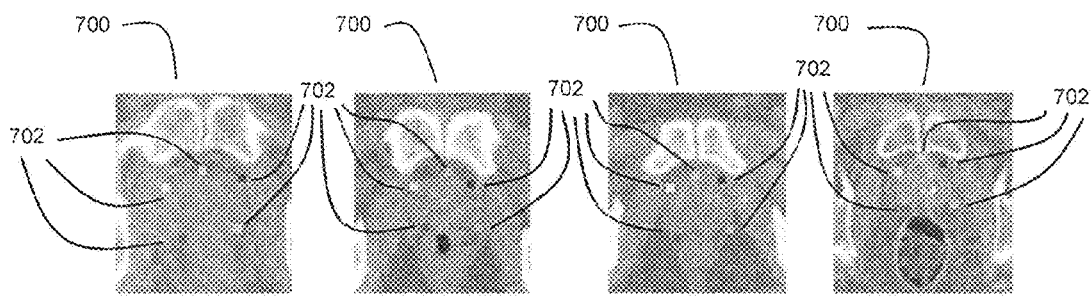
FIG. 7 depicts exemplary images that show landmark detection results.

The process flow of FIGS. 6(*a*) and (*c*) can then return to step 600 to process the next image slice if necessary. Upon processing all of the image slices for the new subject image 106, each slice can have determined locations for the landmarks of interest. FIG. 7 depicts an example of results from applying 5 trained landmark detectors 108 to different image slices 700, where each image slice 700 shows the detected locations 702 for the landmarks of interest.

Figure 9:
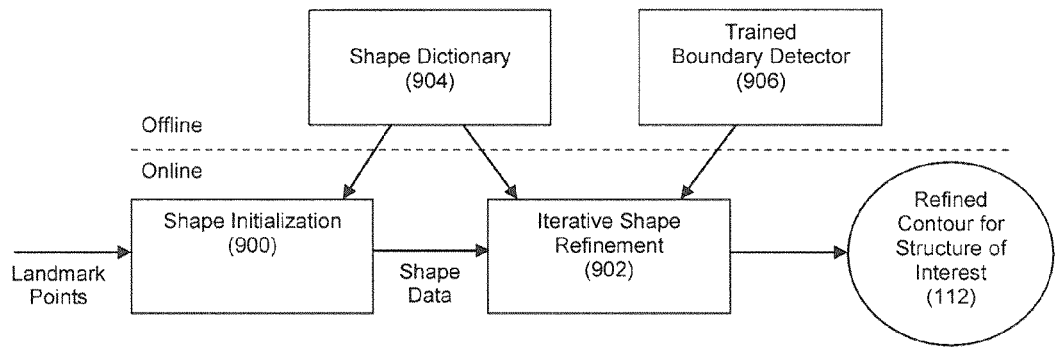
FIG. 9 depicts an exemplary process flow for shape refinement according to an exemplary embodiment that leverages a trained boundary detector and a shape dictionary.

The detected landmark locations from step 210 can be used as a shape initialization input into a shape modeling algorithm. Step 212 then operates to initialize a shape estimate from the detected landmark points and then iteratively refine the shape estimate. FIG. 9 depicts an exemplary process flow for step 212.

The shape initialization and refinement can employ, for example, a shape modeling algorithm such as that described by S. Zhang et al, "*Shape Prior Modeling Using Spare Representation and Online Dictionary Learning*", Medical Image Computing and Computer-Assisted Intervention (MICCAI) 2012, 15 (Pt 3): 435-42, the entire disclosure of which is incorporated herein by reference. At 900, the shape estimate is initialized using the detected landmark points and a shape dictionary 904. The initial shape can be inferred by S in Equation (2) below.

Thus, a sparse shape model can be employed as the shape prior method to infer this shape. It selects a sparse set of shapes in the shape dictionary 904 and composes them together to infer/refine an input shape. This model leverages two sparsity observations of the input shape instance: (1) the input shape can be approximately represented by a sparse linear combination of shapes in the shape dictionary; (2) parts of the input shape may contain gross errors but such errors are sparse. It is able to alleviate three problems of shape prior modeling, i.e., modeling complex shape variations, handling non-Gaussian errors and preserve local detail information of the input shape.

Figure 10:
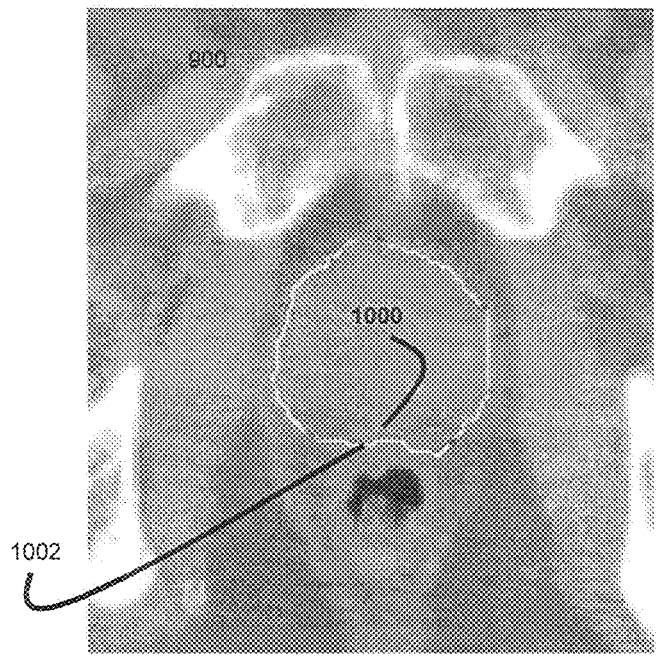
FIG. 10 depicts shape refinement for a structure of interest in accordance with an exemplary embodiment.

Then, at step 902, for each refinement iteration, the algorithm minimizes the following optimization function:

$$\operatorname*{argmin}_{x,e,\beta}\|T(v_S, \beta) - SDx - Se\|_2^2 + \gamma_1\|x\|_1 + \gamma_2\|e\|_1 \qquad (2)$$

Where $v_S$ is a subset of points on the input shape, D is the shape dictionary 904 that represents all training shapes, $T(v_S, \beta)$ is a global transformation operator with parameter $\beta$, which aligns the input shape to the same space of D. x denotes the weight coefficient of the linear combination, and e is a vector that modes the large residual errors. S is a binary diagonal matrix which indicates if the a certain point is in the subset $v_S$. When S becomes very sparse and only includes a few points, the equation becomes the formula of landmark-based shape initialization, which is the first step 900 of the refinement process. Later on, once the edge points get refined by the trained boundary detector 906, there will be more points available to put into the equation, in which case S becomes more dense, but the optimization process is essentially the same. The solved shape is then sent back to the boundary detector 906 for another round of edge refinement. Each iteration, the trained boundary detector 906 can be used to process a plurality of points near a shape point (e.g., 6 points along the normal direction of the point). For each point, the trained boundary detector 906 can generate a probability as to whether that point is "on the boundary" between the structure and non-structure. The processor can then select the point with the highest probability to be an updated edge point. FIG. 10 illustrates an example of a refined shape 1000 relative to a ground-truth shape 1002 for a slice. The iterative process stops once (1) it reaches a certain number of iterations (e.g., 10 iterations), or (2) it reaches a certain minimal residual error.

Figure 11:
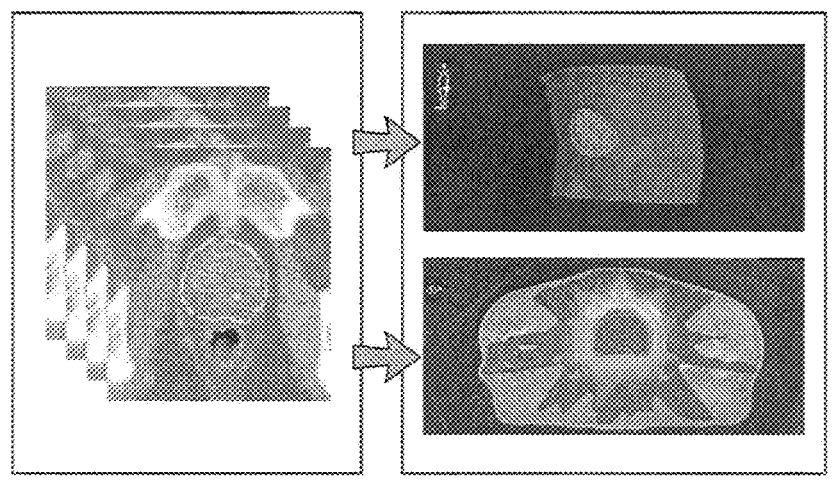
FIG. 11 depicts an exemplary set of refined contour estimates for generating a 3D volume of a structure of interest for use in connection with treatment planning.

Upon the conclusion of the iterative refinement, step 212 produces the refined contour estimate 112. Step 212 can also operate on a slice-by-slice basis to generate a refined contour 112 for each slice of the new subject image 106. A 3D volume of the structure of interest can then be generated from the refined 2D contours 112 for delivery to treatment planning software to calculate/update a treatment plan. FIG. 11 depicts an example of such a 3D volume for an embodiment where the structure of interest is the prostate. However, it should be understood that the refined contour data need not be limited to treatment planning uses, and may also be used to interventionally guide treatment delivery as well.

Figure 12:
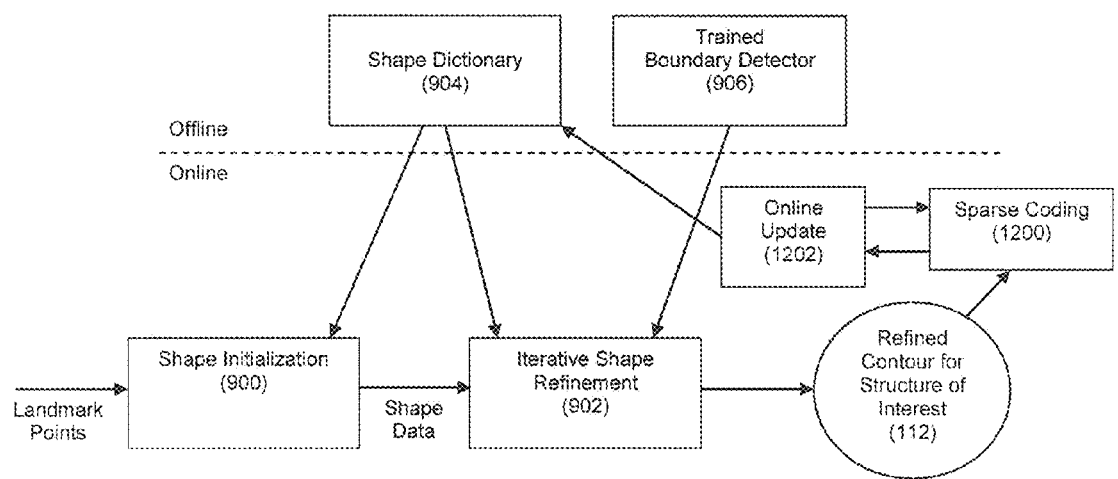
FIG. 12 depicts an exemplary embodiment for updating a shape dictionary.

If desired by a practitioner, dictionary learning techniques can be employs to train a compact shape dictionary 904 instead of using all training shapes and thus improve computational efficiency. One assumption of the sparse linear combination strategy is that the input shape lies within the convex hull defined by training shapes, i.e., an assumption that the training shapes should be sufficiently representative. However, this assumption may not hold in this all segmentation problems, such as the prostate segmentation problem. It is desirable to adaptively increase the representation capacity of the sparse shape model, so it is able to handle new types of shapes. A solution is to include newly segmented shapes in the shape dictionary 904 or re-train the dictionary 904 with all available shapes. However, this approach will significantly reduce the computational efficiency when the data scales up. As another solution, shown by FIG. 12, an online learning method is applied to adaptively and efficiently incorporate new shapes into the shape dictionary 904. When new training shapes come, instead of re-constructing the dictionary from scratch, the existing dictionary 904 is updated using a block-coordinates descent approach. Using the dynamically updated dictionary, the sparse shape model can be gracefully scaled up to model shape priors from a large number of training shapes without sacrificing run-time efficiency. See Mairal, et al., "*Online dictionary learning for sparse coding*", Proc. of the 26th Annual International Conference on Machine Learning, p. 689-696 (2009), the entire disclosure of which is incorporated herein by reference.

This method starts from constructing an initial shape dictionary using the K-SVD algorithm. When new shape comes, it iteratively employs two stages until converge, sparse coding 1200 and dictionary update 1202. Sparse coding 1200 aims to find the sparse coefficient for each signal, and the dictionary update stage 1202 aims to update the dictionary based all discovered coefficients.

Based on stochastic approximation, the dictionary 904 is updated efficiently using block-coordinates descent. It is a parameter-free method and does not require any learning rate tuning. It is important to note that in the dictionary update step 1202, instead of requiring all training shapes, only exploits a small batch of newly coming data. The dictionary update thereby becomes much faster. In this way, the shape dictionary can be efficiently updated online by using new data as selected. Using this online updated dictionary, the run-time efficiency of shape composition is not sacrificed with much more training shapes. In addition, it can be gracefully scaled-up to contain shape priors from, theoretically, an infinite number of training shapes.

Figure 13:
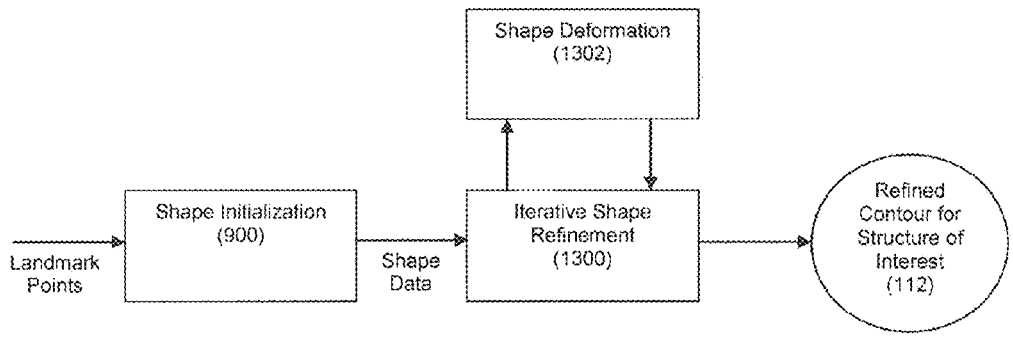
FIG. 13 depicts an exemplary process flow for shape refinement according to an exemplary embodiment that leverages a deformable shape model.

Furthermore, as noted above, shape refinement tools 110 other than a boundary detector and shape dictionary could also be employed in different embodiments. For example, shape deformation can be used, as shown by FIG. 13. With the embodiment of FIG. 13, the iterative shape refinement 1300 employs a deformable shape model 1302. As previously discussed, the shape date from 900 roughly locates the structure shape (e.g., prostate shape) and is used as an initialization. Then, shape refinement 1300 uses a robust deformable model 1302 to accurately segment the prostate. This model can be driven by both gradient and region terms derived from the image. The gradient data terms can include the gradient map, edge distance map, or a combination of both. Models solely relying on gradient information may stuck in local minima. Region information can alleviate these problems caused by unclear boundaries or complex textures. The region term encodes constraints for the model-interior appearance statistics. Considering a module using intensity statistics, the object region is predicted according to the current model-interior intensity distribution. Having both foreground object and background probabilities, a binary map can be obtained that represents the predicted object region by applying the Bayesian Decision rule. Connected component analysis is then applied to the binary map to retrieve the connected component that overlaps the current model. This connected region is considered as the current region of interest (ROI). The gradient data term and the region data term provides two-way balloon forces that deform the model toward the predicted ROI boundary. This allows flexible model initializations either overlapping the object or inside the object. Using these external energy terms as image forces, this robust deformable model is driven to find object boundaries accurately.

While the present invention has been described above in relation to its preferred embodiments, various modifications may be made thereto that still fall within the invention's scope. Such modifications to the invention will be recognizable upon review of the teachings herein. Accordingly, the full scope of the present invention is to be defined solely by the appended claims and their legal equivalents.

What is claimed is:

1. An apparatus for delineating a structure of interest within image data, the image data comprising a subject image of a region of interest, the region of interest including the structure of interest, the image comprising a plurality of data points, the data points comprising a plurality of intensity values, the apparatus comprising:
a processor configured to:
compute a plurality of features for a plurality of the data points, the features being indicative of intensity variations over a plurality of windows of the data points,
detect a plurality of locations for a plurality of landmarks within the image based on an application of the computed features to a trained landmark detector,
generate a shape estimate for the structure of interest based on the detected landmark locations, and
iteratively refine, based on a sparse shape model from a shape dictionary, the shape estimate for the structure of interest.

2. The apparatus of claim 1, wherein the trained landmark detector comprises a plurality of trained landmark detectors, each trained landmark detector being configured to detect a different one of the landmarks.

3. The apparatus of claim 1, wherein the processor is further configured to process atlas image data using a machine-learning algorithm to train the trained landmark detector, wherein the atlas image data includes an identification of where a landmark is located in a plurality of atlas images.

4. The apparatus of claim 3, wherein the machine-learning algorithm comprises a LogitBoost machine-learning algorithm.

5. The apparatus of claim 3, wherein the atlas images comprise three-dimensional (3D) atlas images, and wherein the processor is further configured to process the atlas image data processing step by:
extracting a plurality of two-dimensional (2D) atlas image slices from the 3D atlas images,
aligning the 2D atlas image slices according to an image registration technique,
collecting a plurality of positive samples and a plurality of negative samples from each of a plurality of the atlas image slices,
computing the features for the collected positive and negative samples for each of a plurality of the atlas image slices, and
applying the collected positive and negative samples and the features computed therefor to the machine-learning algorithm to train a landmark detector to detect a landmark of interest.

6. The apparatus of claim 1, wherein the processor is further configured to perform the detection operation by:
applying the computed features to the trained landmark detector to score a plurality of candidate data points,
comparing the scores with a threshold, and
classifying the candidate data points for eligibility with respect to a landmark of interest based on the comparison.

7. The apparatus of claim 6, wherein the processor is further configured to perform the detection operation by generating a probability map for a plurality of locations for the landmarks other than the landmark of interest based on a location for a candidate data point classified as the landmark of interest and a landmark distribution model.

8. The apparatus of claim 7, wherein the processor is further configured to perform the detection operation by determining which locations on the probability map score above another threshold, and determining the landmark locations by averaging the locations from the probability map that score above the another threshold.

9. The apparatus of claim 6, wherein the processor is further configured to select a subset of the data points, and limit the applying operation to the selected subset of data points.

10. The apparatus of claim 1, wherein the refined shape estimate comprises a contour of the structure of interest, and wherein the processor is further configured to define a radiotherapy treatment plan for the structure of interest based on the contour.

11. The apparatus of claim 1, wherein the image comprises a computed tomography image.

12. The apparatus of claim 11, wherein the structure of interest comprises a prostate.

13. An apparatus for training a landmark detector using a plurality of atlas images, the atlas images including location information for a landmark with respect to a structure of interest, the apparatus comprising:
a processor configured to:
collect a plurality of positive samples and a plurality of negative samples from the atlas images,
compute a plurality of sample features for the collected positive and negative samples, wherein the sample features indicate intensity variations over a plurality of the positive and negative samples, and
apply the computed sample features and location data associated with the computed sample features to a machine-learning algorithm to train a landmark detector to detect the landmark.

14. An apparatus delineating a structure of interest within image data, the apparatus comprising:
a processor configured to:
detect a plurality of landmarks with respect to a structure in an image;
generate, for each detected landmark, at least one probability map mapping a location probability for each other detected landmark;
determine, based on the probability maps, the location of the detected landmarks; and
generate, based on the determined landmark locations, a shape estimate for the structure.

15. The apparatus of claim 14, wherein the processor is further configured to refine the shape estimate according to a shape refinement tool to thereby compute a refined shape estimate for the structure of interest, wherein the shape refinement tool comprises a trained boundary detector, and wherein the processor is further configured to perform the refinement operation by estimating boundaries for the shape estimate using the trained boundary detector.

16. The apparatus of claim 15, wherein the processor is further configured to process atlas image data using a machine-learning algorithm to train the boundary detector, wherein the atlas image data includes an identification of where a boundary for the structure of interest is located in a plurality of atlas images.

17. The apparatus of claim 16, wherein the machine-learning algorithm comprises a random forests machine-learning algorithm.

18. The apparatus of claim 15, wherein the shape refinement tool further comprises a shape dictionary, and wherein the processor is further configured to perform the refinement operation iteratively refining the shape estimate based on a sparse shape model.

19. The apparatus of claim 18, wherein the processor is further configured to online update the shape dictionary based on the refined shape estimate for the structure of interest.

20. The apparatus of claim 14, wherein each probability map is defined according to a distribution model for the respective landmark.

21. The apparatus of claim 14, wherein the processor is further configured to:
detect a plurality of additional landmarks;
generate, for each of the detected additional landmarks, at least one probability map mapping a location probability for each other detected additional landmark;
determine, based on the probability maps for the additional landmarks, the location of the additional landmarks; and
refine, based on the determined additional landmark locations, the shape estimate for the structure.

* * * * *